(12) United States Patent
Li et al.

(10) Patent No.: US 7,933,094 B2
(45) Date of Patent: Apr. 26, 2011

(54) MAGNETIC HEAD FOR PERPENDICULAR MAGNETIC RECORDING HAVING A SHIELD THAT INCLUDES A PART RECESSED FROM MEDIUM FACING SURFACE

(75) Inventors: Dong-Hong Li, Fremont, CA (US); Yoshitaka Sasaki, Milpitas, CA (US); Hiroyuki Itoh, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 720 days.

(21) Appl. No.: 11/987,100

(22) Filed: Nov. 27, 2007

(65) Prior Publication Data
US 2009/0135530 A1  May 28, 2009

(51) Int. Cl.
*G11B 5/147* (2006.01)
*G11B 5/10* (2006.01)
(52) U.S. Cl. .............................. 360/123.12; 360/125.06
(58) Field of Classification Search ............. 360/125.02, 360/125.06–125.08, 123.12, 119.02
See application file for complete search history.

(56) References Cited

U.S. PATENT DOCUMENTS

| | | | |
|---|---|---|---|
| 4,656,546 A | 4/1987 | Mallory | |
| 4,672,493 A | 6/1987 | Schewe | |
| 6,504,675 B1 | 1/2003 | Shukh et al. | |
| 6,768,611 B2 | 7/2004 | Sato et al. | |
| 7,633,714 B2 * | 12/2009 | Sasaki et al. | 360/125.3 |
| 7,646,564 B2 * | 1/2010 | Maruyama et al. | 360/125.07 |
| 2002/0080524 A1 * | 6/2002 | Takahashi et al. | 360/126 |
| 2002/0080525 A1 * | 6/2002 | Sato et al. | 360/126 |
| 2005/0041337 A1 * | 2/2005 | Yazawa et al. | 360/126 |
| 2006/0098338 A1 * | 5/2006 | Watabe et al. | 360/126 |
| 2006/0126223 A1 * | 6/2006 | Kameda | 360/126 |
| 2006/0158779 A1 * | 7/2006 | Ota et al. | 360/126 |
| 2007/0109684 A1 * | 5/2007 | Kobayashi | 360/126 |
| 2007/0121248 A1 * | 5/2007 | Sasaki et al. | 360/126 |

(Continued)

FOREIGN PATENT DOCUMENTS

JP  A-01-128214  5/1989

(Continued)

OTHER PUBLICATIONS

Office Action issued in Japanese Patent Application No. 2008-185705, on May 26, 2010 (with translation).

(Continued)

*Primary Examiner* — Brian E Miller
(74) *Attorney, Agent, or Firm* — Oliff & Berridge, PLC

(57) ABSTRACT

A pole layer has an end face located in a medium facing surface, allows a magnetic flux corresponding to a magnetic field generated by a coil to pass therethrough, and generates a write magnetic field. A shield includes a first layer having an end face located in the medium facing surface at a position forward of the end face of the pole layer along a direction of travel of a recording medium, and a second layer disposed between at least part of the coil and the medium facing surface and magnetically connected to the first layer. The second layer has an end face closer to the medium facing surface, and this end face is located at a distance from the medium facing surface. A nonmagnetic layer made of an inorganic insulating material is provided between the end face of the second layer and the medium facing surface, and a photoresist layer is provided between the end face of the second layer and the nonmagnetic layer.

9 Claims, 9 Drawing Sheets

U.S. PATENT DOCUMENTS

| | | | |
|---|---|---|---|
| 2007/0211377 A1* | 9/2007 | Sasaki et al. | 360/126 |
| 2007/0230047 A1* | 10/2007 | Jin et al. | 360/126 |
| 2008/0112081 A1* | 5/2008 | Matono | 360/125.08 |

FOREIGN PATENT DOCUMENTS

| | | |
|---|---|---|
| JP | A-04-061611 | 2/1992 |
| JP | A-8-7222 | 1/1996 |
| JP | A-11-086219 | 3/1999 |
| JP | A-2001-256610 | 9/2001 |
| JP | A-2001-256614 | 9/2001 |
| JP | A-2007-157312 | 6/2007 |
| JP | A-2007-242210 | 9/2007 |

OTHER PUBLICATIONS

Japanese Patent Office, *Notice of Reasons for Rejection for Japanese Patent Application No.* 2008-185705 (with English translation), Jan. 14, 2011, pp. 1-3 for translation).

\* cited by examiner

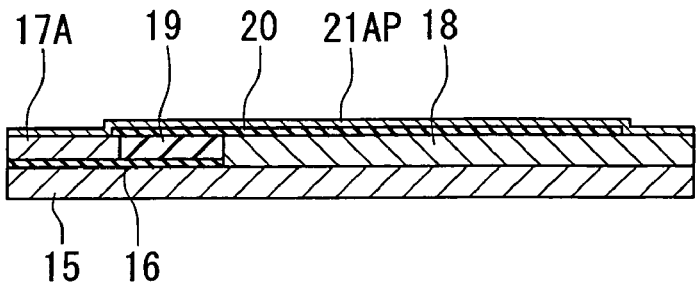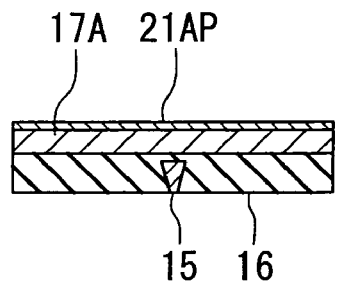
FIG. 4A  FIG. 4B
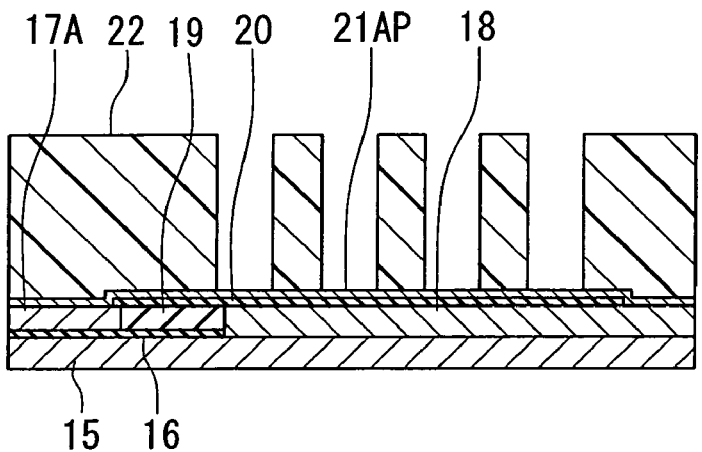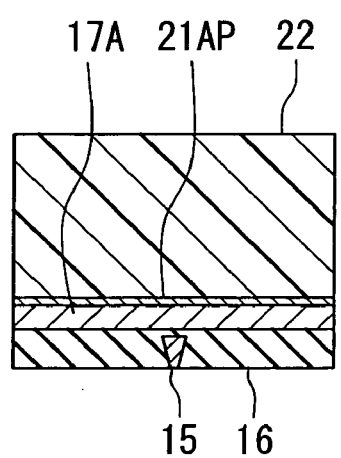
FIG. 5A  FIG. 5B
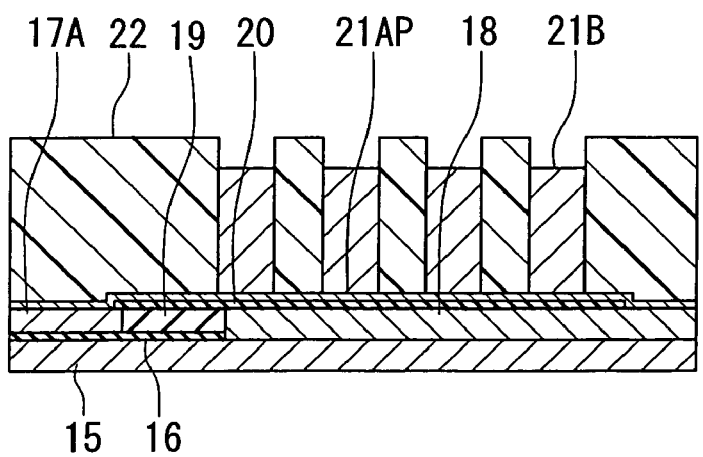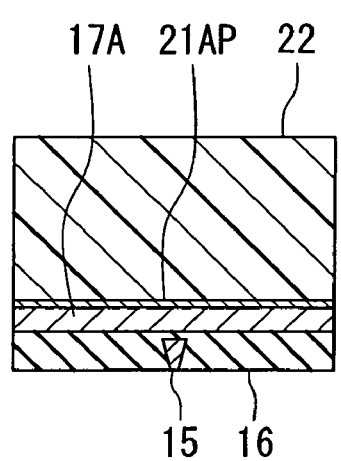
FIG. 6A  FIG. 6B

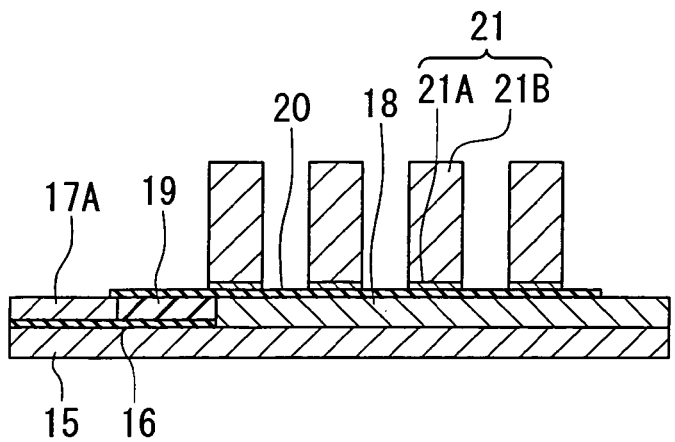 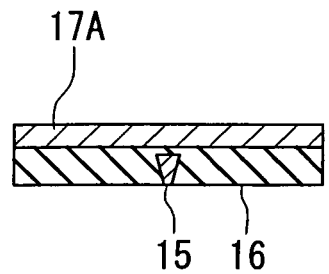
FIG. 7A FIG. 7B
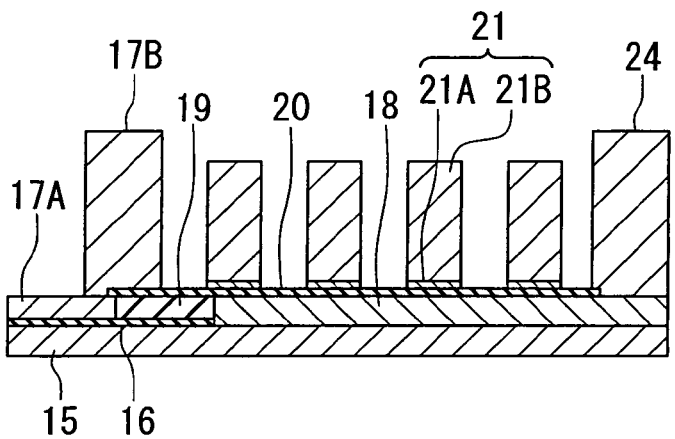 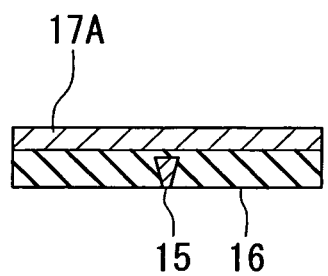
FIG. 8A FIG. 8B
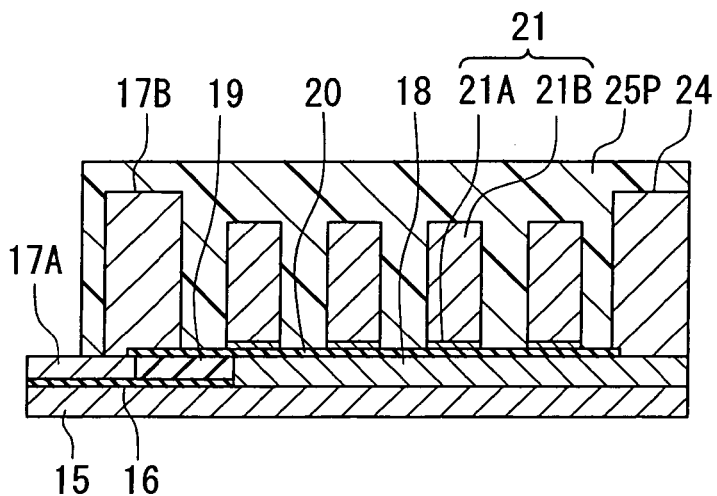 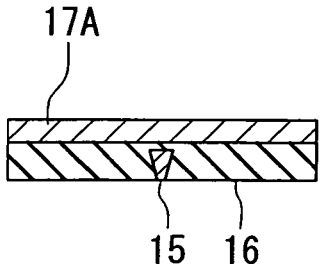
FIG. 9A FIG. 9B

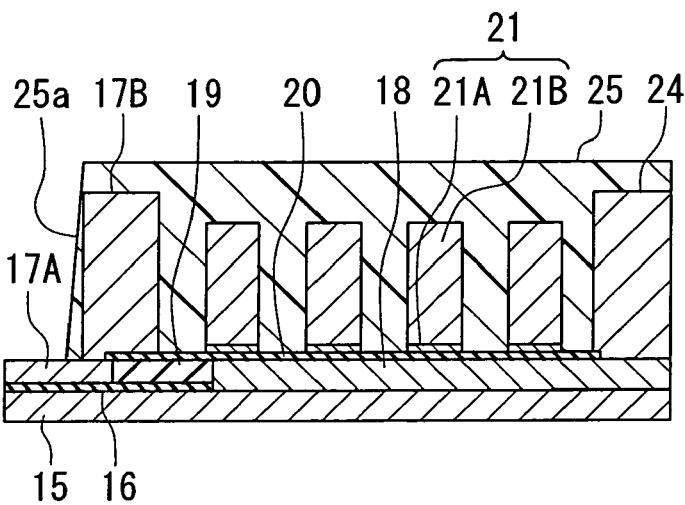
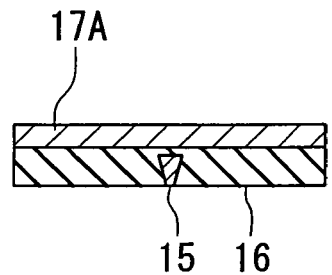
FIG. 10A  FIG. 10B
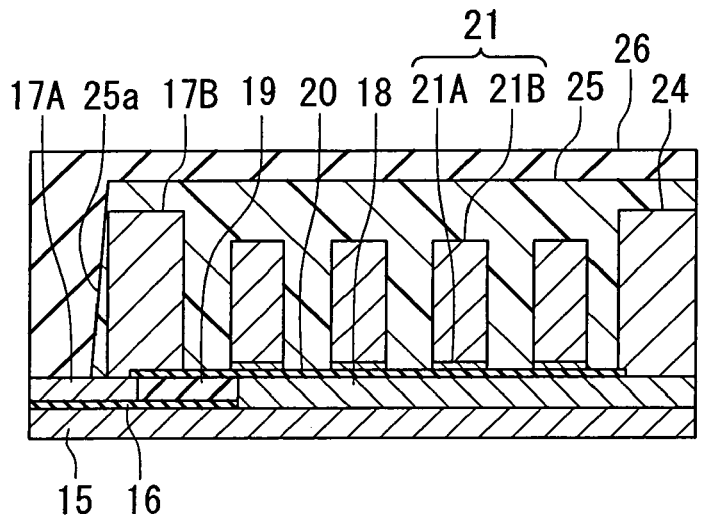
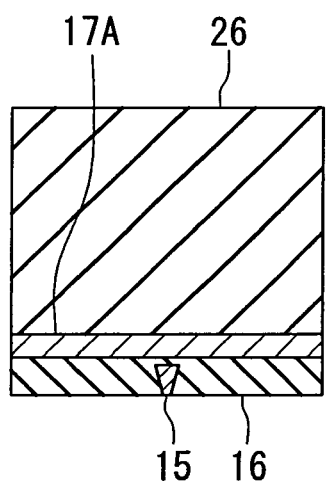
FIG. 11A  FIG. 11B
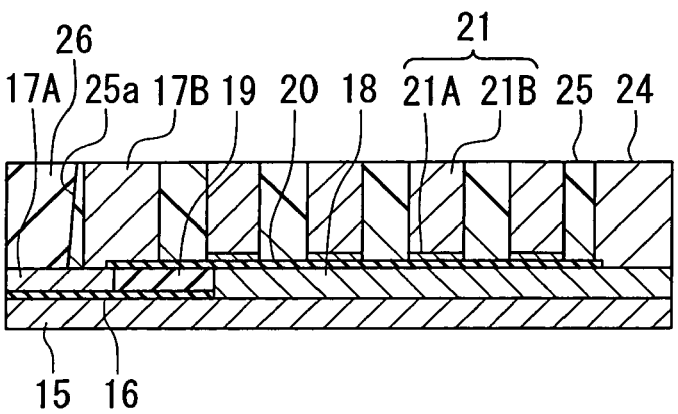
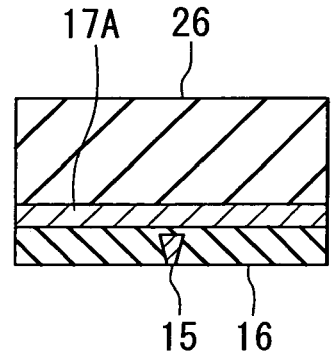
FIG. 12A  FIG. 12B

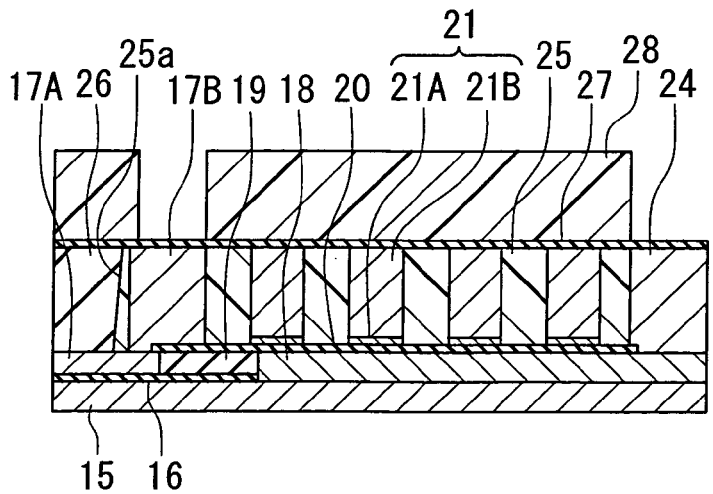 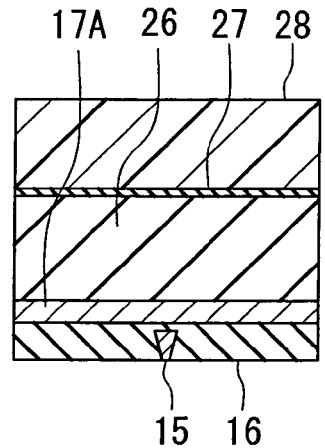
FIG. 13A  FIG. 13B
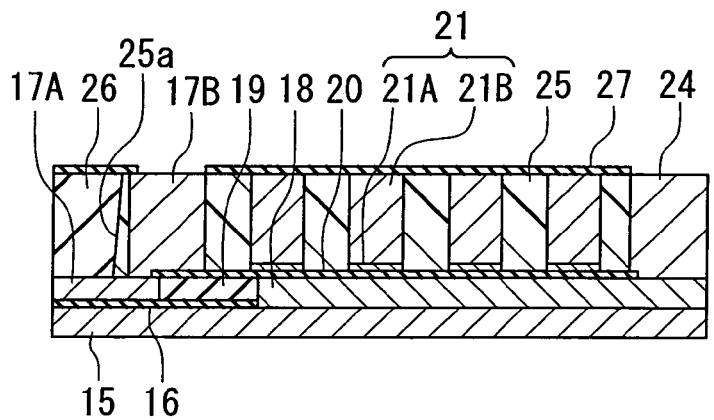 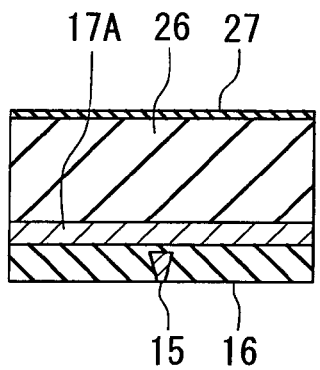
FIG. 14A  FIG. 14B
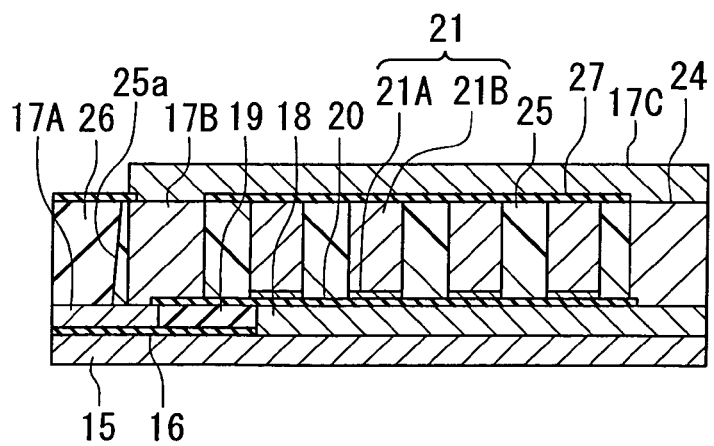 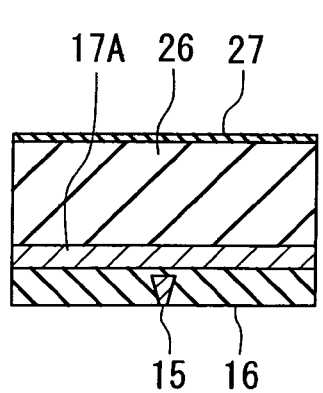
FIG. 15A  FIG. 15B

MAGNETIC HEAD FOR PERPENDICULAR MAGNETIC RECORDING HAVING A SHIELD THAT INCLUDES A PART RECESSED FROM MEDIUM FACING SURFACE

BACKGROUND OF THE INVENTION

1. Field of the Invention

The present invention relates to a magnetic head for perpendicular magnetic recording that is used for writing data on a recording medium by means of a perpendicular magnetic recording system, and to a method of manufacturing such a magnetic head.

2. Description of the Related Art

The recording systems of magnetic read/write devices include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of implementing higher linear recording density, compared with the longitudinal magnetic recording system.

Typically, magnetic heads for perpendicular magnetic recording have a structure in which a reproducing (read) head having a magnetoresistive element (that may be hereinafter referred to as an MR element) for reading and a recording (write) head having an induction-type electromagnetic transducer for writing are stacked on a substrate, like magnetic heads for longitudinal magnetic recording. The write head includes a pole layer that produces a magnetic field in the direction perpendicular to the plane of the recording medium.

For the perpendicular magnetic recording system, it is an improvement of the recording medium and an improvement of the write head that mainly contributes to an improvement in recording density. It is a reduction in track width and an improvement in write characteristics that is particularly required for the write head to achieve higher recording density. On the other hand, if the track width is reduced, the write characteristics, such as an overwrite property that is a parameter indicating an overwriting capability, suffer degradation. Better write characteristics are therefore required as the track width becomes smaller.

A magnetic head for use in a magnetic disk drive such as a hard disk drive is typically provided in a slider. The slider has a medium facing surface that faces toward the recording medium. The medium facing surface has an air-inflow-side end and an air-outflow-side end. The slider is configured to slightly fly over the surface of the recording medium by means of an airflow that comes from the air-inflow-side end into the space between the medium facing surface and the recording medium. The magnetic head is typically disposed near the air-outflow-side end of the medium facing surface of the slider. In a magnetic disk drive, the magnetic head is aligned through the use of a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs in accordance with the position of the magnetic head across the tracks.

In a magnetic disk drive of the perpendicular magnetic recording system, in particular, which exhibits a better capability of writing on a recording medium compared with the longitudinal magnetic recording system, if the above-mentioned skew occurs, there arise problems such as a phenomenon in which, when data is written on a certain track, data stored on a track adjacent thereto is erased (this is hereinafter called adjacent track erasing), or unwanted writing between two adjacent tracks. To achieve higher recording density, it is required to suppress adjacent track erasing. Unwanted writing between two adjacent tracks affects detection of servo signals for alignment of the magnetic head and the signal-to-noise ratio of read signals.

For preventing the problems resulting from the skew described above, there is known a technique in which an end face of the pole layer located in the medium facing surface is formed into such a shape that one of its sides located backward along the direction of travel of the recording medium (that is, the side located closer to the air inflow end of the slider) is shorter than the opposite side, as disclosed in U.S. Pat. No. 6,504,675 B1, for example.

As a magnetic head for perpendicular magnetic recording, there is known a magnetic head including the pole layer and a shield, as disclosed in U.S. Pat. No. 4,656,546, for example. In this magnetic head, an end face of the shield is located in the medium facing surface at a position forward of the end face of the pole layer along the direction of travel of the recording medium with a predetermined small distance provided therebetween. Such a magnetic head will be hereinafter called a shield-type head. In shield-type heads, the shield has a function of preventing a magnetic flux from reaching the recording medium, the flux being generated from the end face of the pole layer and expanding in directions except the direction perpendicular to the plane of the recording medium. The shield also has a function of returning a magnetic flux that has been generated from the end face of the pole layer and has magnetized the recording medium. Shield-type heads allow a further improvement in linear recording density.

U.S. Pat. No. 4,672,493 discloses a magnetic head having a central magnetic layer that serves as the pole layer and other magnetic layers that are respectively disposed forward and backward of the central magnetic layer along the direction of travel of the recording medium, with coils provided between the central magnetic layer and the magnetic layer disposed forward and between the central magnetic layer and the magnetic layer disposed backward, respectively. This magnetic head is capable of increasing components of the magnetic field generated from the medium-facing-surface-side end of the central magnetic layer, the components lying in the direction perpendicular to the plane of the recording medium.

Reference is now made to FIG. 18 to describe a basic configuration of shield-type heads. FIG. 18 is a cross-sectional view of a main part of an example of shield-type heads. This shield-type head includes: a medium facing surface 100 that faces toward a recording medium; a coil 101 for generating a magnetic field corresponding to data to be written on the recording medium; a pole layer 102 having an end located in the medium facing surface 100, the pole layer 102 allowing a magnetic flux corresponding to the magnetic field generated by the coil 101 to pass and generating a write magnetic field for writing the data on the recording medium by means of the perpendicular magnetic recording system; a shield layer 103 having an end located in the medium facing surface 100, the shield layer 103 being coupled to a portion of the pole layer 102 away from the medium facing surface 100; a gap layer 104 provided between the pole layer 102 and the shield layer 103; and an insulating layer 105 covering the coil 101. An insulating layer 106 is disposed around the pole layer 102. The shield layer 103 is covered with a protection layer 107.

In the medium facing surface 100, the end of the shield layer 103 is located forward of the end of the pole layer 102 along the direction T of travel of the recording medium, with a predetermined distance therebetween provided by the thickness of the gap layer 104. At least part of the coil 101 is disposed between the pole layer 102 and the shield layer 103 and insulated from the pole layer 102 and the shield layer 103.

The coil 101 is made of a conductive material such as copper. The pole layer 102 and the shield layer 103 are made of a magnetic material. The gap layer 104 is made of an insulating material such as alumina ($Al_2O_3$). The insulating layer 105 is made of photoresist, for example.

In the head of FIG. 18, the gap layer 104 is disposed on the pole layer 102 and the coil 101 is disposed on the gap layer 104. The coil 101 is covered with the insulating layer 105. One of the ends of the insulating layer 105 closer to the medium facing surface 100 is located at a distance from the medium facing surface 100. In the region from the medium facing surface 100 to the end of the insulating layer 105 closer to the medium facing surface 100, the shield layer 103 is opposed to the pole layer 102 with the gap layer 104 disposed in between. The length (height) of the portion where the pole layer 102 and the shield layer 103 are opposed to each other with the gap layer 104 disposed in between, as taken from the end closer to the medium facing surface 100 to the opposite end, is called throat height TH. The throat height TH has an influence on the intensity and distribution of the magnetic field generated from the pole layer 102 in the medium facing surface 100.

In a shield-type head, such as the one illustrated in FIG. 18, it is desirable to reduce the throat height TH to improve the overwrite property. It is required that the throat height TH be 0.1 to 0.3 μm, for example. When such a small throat height TH is required, the head of FIG. 18 encounters a problem that, during operation of the head, the insulating layer 105 expands due to heat generated by the coil 101 and consequently an end portion of the shield layer 103 closer to the medium facing surface 100 protrudes. The protrusion of the end portion of the shield layer 103 during operation of the head increases the possibility of collision of the slider with the recording medium.

U.S. Patent Application Publication No. US 2007-0121248 A1 and U.S. Patent Application Publication No. US 2007-0211377 A1 each disclose a magnetic head capable of solving the problem mentioned above. The magnetic head disclosed in each of these publications includes a shield having a first layer and a second layer. The first layer has an end face located in the medium facing surface. The second layer is disposed between at least part of the coil and the medium facing surface, and is magnetically connected to the first layer. In addition, the second layer has an end face closer to the medium facing surface, and this end face is located at a distance from the medium facing surface. The shield having such a structure will be hereinafter called a recessed shield.

The magnetic head employing the recessed shield is capable of suppressing the protrusion of the end portion of the shield closer to the medium facing surface induced by the heat generated by the coil. However, a problem was found to occur in the magnetic head employing the recessed shield, as described below. In the head employing the recessed shield, a nonmagnetic layer is provided between the medium facing surface and the end face of the second layer of the shield. The nonmagnetic layer is formed by sputtering, for example, using an inorganic insulating material such as alumina ($Al_2O_3$). In this case, it is difficult to achieve complete coverage by the inorganic insulating material over the end face of the second layer, and consequently a crack is likely to develop from the interface between the nonmagnetic layer and the end face of the second layer. The crack easily reaches the medium facing surface because the distance between the end face of the second layer and the medium facing surface is small. The crack impairs the reliability of the magnetic head.

OBJECT AND SUMMARY OF THE INVENTION

It is an object of the present invention to provide a magnetic head for perpendicular magnetic recording that includes a shield and a nonmagnetic layer, the shield including: a first layer having an end face located in a medium facing surface; and a second layer magnetically connected to the first layer and having an end face located away from the medium facing surface, the nonmagnetic layer being disposed between the second layer and the medium facing surface, the magnetic head being capable of preventing the occurrence of a crack in the nonmagnetic layer, and to provide a method of manufacturing such a magnetic head.

A magnetic head for perpendicular magnetic recording according to the present invention includes: a medium facing surface that faces toward a recording medium; a coil for generating a magnetic field corresponding to data to be written on the recording medium; a pole layer having an end face located in the medium facing surface, the pole layer allowing a magnetic flux corresponding to the magnetic field generated by the coil to pass therethrough and generating a write magnetic field for writing the data on the recording medium by means of a perpendicular magnetic recording system; a shield made of a magnetic material; and a gap layer made of a nonmagnetic material.

The shield includes: a first layer having an end face located in the medium facing surface at a position forward of the end face of the pole layer along a direction of travel of the recording medium; and a second layer disposed between at least part of the coil and the medium facing surface and magnetically connected to the first layer. The second layer has an end face closer to the medium facing surface, the end face being located at a distance from the medium facing surface. The gap layer is disposed between the pole layer and the first layer.

The magnetic head for perpendicular magnetic recording according to the present invention further includes: a nonmagnetic layer made of an inorganic insulating material and disposed between the end face of the second layer and the medium facing surface; and a photoresist layer disposed between the end face of the second layer and the nonmagnetic layer.

In the magnetic head for perpendicular magnetic recording according to the present invention, the photoresist layer provided between the nonmagnetic layer and the end face of the second layer of the shield serves to prevent the occurrence of a crack in the nonmagnetic layer.

In the magnetic head for perpendicular magnetic recording according to the present invention, the second layer and the at least part of the coil may be disposed forward of the first layer along the direction of travel of the recording medium, and the second layer may be directly connected to the first layer.

In the magnetic head for perpendicular magnetic recording according to the present invention, the second layer and the at least part of the coil may be disposed backward of the pole layer along the direction of travel of the recording medium, and the shield may further include a coupling portion that couples the first layer and the second layer to each other without touching the pole layer.

The magnetic head for perpendicular magnetic recording according to the present invention may further include a substrate on which the coil, the pole layer, the shield, the gap layer, the nonmagnetic layer and the photoresist layer are stacked, the photoresist layer may have an end face that touches the nonmagnetic layer, and the distance from the medium facing surface to any point on this end face may increase with increasing distance from the substrate to the point.

A method of manufacturing the magnetic head for perpendicular magnetic recording according to the present invention includes the steps of: forming the pole layer; forming the gap layer on the pole layer; forming the first layer on the gap layer; forming the coil; forming the second layer; forming the photoresist layer after the second layer is formed; and forming the nonmagnetic layer after the photoresist layer is formed.

In the method of manufacturing the magnetic head for perpendicular magnetic recording according to the invention, forming the photoresist layer and the nonmagnetic layer in this order after forming the second layer of the shield serves to prevent the occurrence of a crack in the nonmagnetic layer.

In the method of manufacturing the magnetic head for perpendicular magnetic recording according to the invention, the second layer and at least part of the coil may be disposed forward of the first layer along the direction of travel of the recording medium, the second layer may be directly connected to the first layer, and the second layer may be formed after the first layer is formed.

In the method of manufacturing the magnetic head for perpendicular magnetic recording according to the invention, the second layer and the at least part of the coil may be disposed backward of the pole layer along the direction of travel of the recording medium, and the shield may further include a coupling portion that couples the first layer and the second layer to each other without touching the pole layer. In this case, the method of manufacturing the magnetic head may further include the step of forming the coupling portion, the coupling portion may be formed after the second layer is formed, and the first layer may be formed after the coupling portion is formed.

The magnetic head for perpendicular magnetic recording manufactured by the manufacturing method according to the invention may further include a substrate on which the coil, the pole layer, the shield, the gap layer, the nonmagnetic layer and the photoresist layer are stacked, the photoresist layer may have an end face that touches the nonmagnetic layer, and the distance from the medium facing surface to any point on this end face may increase with increasing distance from the substrate to the point. In this case, the step of forming the photoresist layer may include the steps of: forming an initial layer that is to become the photoresist layer later by undergoing heat treatment; and heat-treating the initial layer so that the initial layer shrinks to thereby become the photoresist layer.

In the method of manufacturing the magnetic head for perpendicular magnetic recording according to the invention, the nonmagnetic layer may be formed by sputtering.

Other objects, features and advantages of the present invention will become fully apparent from the following description.

BRIEF DESCRIPTION OF THE DRAWINGS

FIG. 4A and FIG. 4B are views for illustrating a step of a method of manufacturing the magnetic head of the first embodiment of the invention.

FIG. 5A and FIG. 5B are views for illustrating a step that follows the step of FIG. 4A and FIG. 4B.

FIG. 6A and FIG. 6B are views for illustrating a step that follows the step of FIG. 5A and FIG. 5B.

FIG. 7A and FIG. 7B are views for illustrating a step that follows the step of FIG. 6A and FIG. 6B.

FIG. 8A and FIG. 8B are views for illustrating a step that follows the step of FIG. 7A and FIG. 7B.

FIG. 9A and FIG. 9B are views for illustrating a step that follows the step of FIG. 8A and FIG. 8B.

FIG. 10A and FIG. 10B are views for illustrating a step that follows the step of FIG. 9A and FIG. 9B.

FIG. 11A and FIG. 11B are views for illustrating a step that follows the step of FIG. 10A and FIG. 10B.

FIG. 12A and FIG. 12B are views for illustrating a step that follows the step of FIG. 11A and FIG. 11B.

FIG. 13A and FIG. 13B are views for illustrating a step that follows the step of FIG. 12A and FIG. 12B.

FIG. 14A and FIG. 14B are views for illustrating a step that follows the step of FIG. 13A and FIG. 13B.

FIG. 15A and FIG. 15B are views for illustrating a step that follows the step of FIG. 14A and FIG. 14B.

DETAILED DESCRIPTION OF THE PREFERRED EMBODIMENTS

First Embodiment

Figure 1:
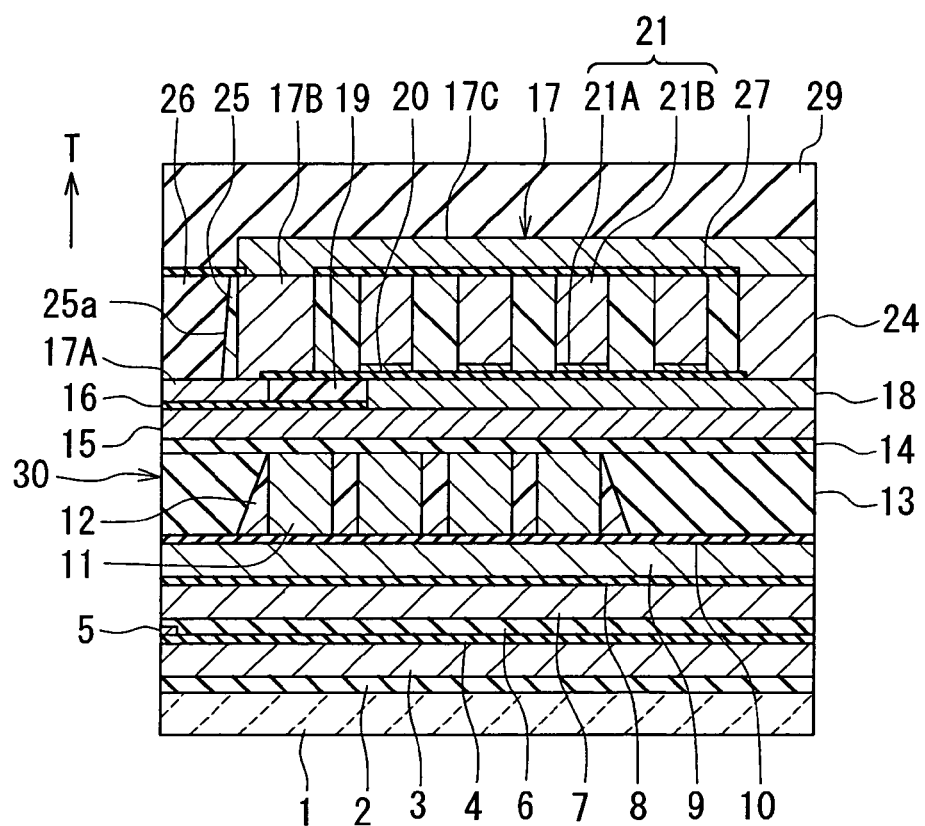
FIG. 1 is a cross-sectional view illustrating the configuration of a magnetic head of a first embodiment of the invention.
Figure 2:
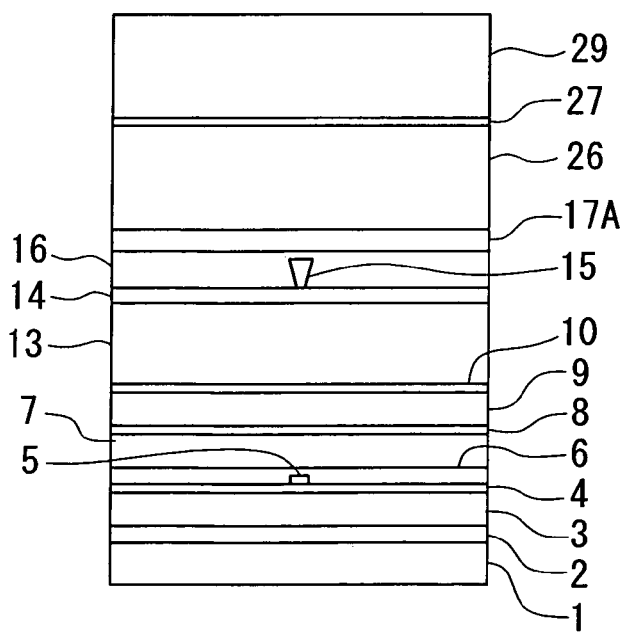
FIG. 2 is a front view of the medium facing surface of the magnetic head of the first embodiment of the invention.
Figure 3:
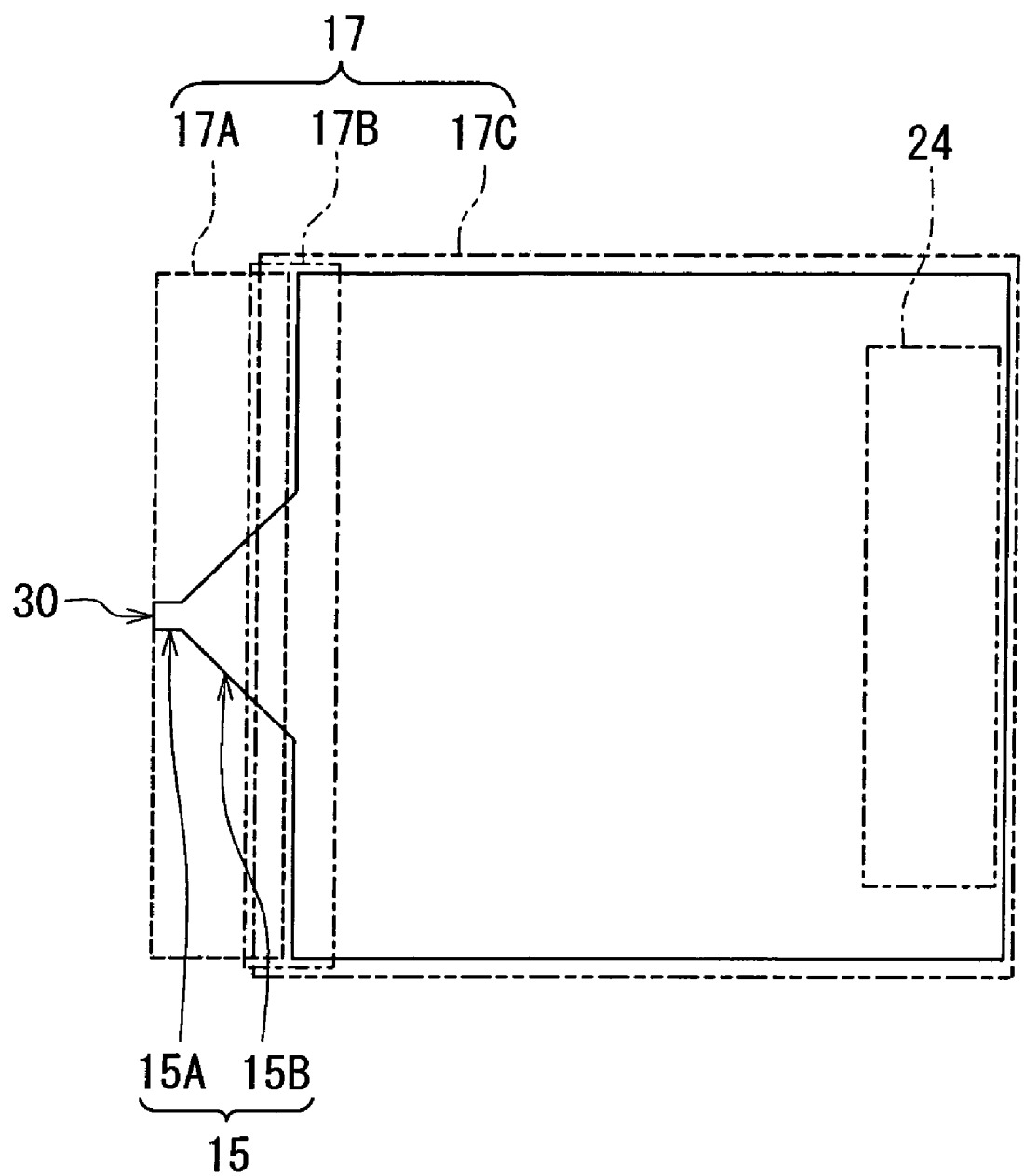
FIG. 3 is a top view of the pole layer and the shield of the magnetic head of the first embodiment of the invention.

Embodiments of the present invention will now be described in detail with reference to the drawings. Reference is first made to FIG. 1 to FIG. 3 to describe the configuration of a magnetic head for perpendicular magnetic recording (hereinafter simply referred to as a magnetic head) of a first embodiment of the invention. FIG. 1 is a cross-sectional view illustrating the configuration of the magnetic head of the first embodiment. FIG. 1 illustrates a cross section perpendicular to the medium facing surface and the top surface of the substrate. In FIG. 1 the arrow marked with T shows the direction of travel of a recording medium. FIG. 2 is a front view of the medium facing surface of the magnetic head of the first embodiment. FIG. 3 is a top view of a pole layer and a shield of the magnetic head of the first embodiment.

As illustrated in FIG. 1 and FIG. 2, the magnetic head of this embodiment includes: a substrate 1 made of a ceramic material such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a first top shield layer 7 made of a magnetic material and disposed on the top shield gap film 6.

An end of the MR element 5 is located in a medium facing surface 30 that faces toward the recording medium. The MR element 5 may be an element made of a magneto-sensitive film that exhibits a magnetoresistive effect, such as an AMR (anisotropic magnetoresistive) element, a GMR (giant magnetoresistive) element, or a TMR (tunneling magnetoresistive) element. The GMR element may be of a CIP (current-in-plane) type wherein a current used for detecting magnetic signals is fed in a direction nearly parallel to the planes of layers constituting the GMR element, or may be of a CPP (current-perpendicular-to-plane) type wherein a current used for detecting magnetic signals is fed in a direction nearly perpendicular to the planes of the layers constituting the GMR element.

The magnetic head further includes a nonmagnetic layer 8 and a second top shield layer 9 that are disposed in this order on the first top shield layer 7. The nonmagnetic layer 8 is made of a nonmagnetic material such as alumina. The second top shield layer 9 is made of a magnetic material. The portion from the bottom shield layer 3 to the second top shield layer 9 makes up a read head.

The magnetic head further includes: an insulating layer 10 made of an insulating material and disposed on the second top shield layer 9; a coil 11 disposed on the insulating layer 10; an insulating layer 12 made of an insulating material and disposed around the coil 11 and in the space between the respective adjacent turns of the coil 11; and an insulating layer 13 made of an insulating material and disposed around the insulating layer 12. The coil 11 is planar spiral-shaped. The coil 11 and the insulating layers 12 and 13 have flattened top surfaces. The insulating layers 10 and 13 are made of alumina, for example. The insulating layer 12 is made of photoresist, for example. The coil 11 is made of a conductive material such as copper.

The magnetic head further includes: an insulating layer 14 made of an insulating material and disposed on the flattened top surfaces of the coil 11 and the insulating layers 12 and 13; a pole layer 15 made of a magnetic material and disposed on the insulating layer 14; and a gap layer 16 made of a nonmagnetic material and disposed to cover a portion of the pole layer 15. The pole layer 15 has an end face located in the medium facing surface 30. The insulating layer 14 and the gap layer 16 are made of alumina, for example. A portion of the gap layer 16 located on the pole layer 15 has an opening that is located away from the medium facing surface 30.

The magnetic head further includes a shield 17 made of a magnetic material. The shield 17 includes a first layer 17A disposed adjacent to the gap layer 16, a second layer 17B disposed on a side of the first layer 17A opposite to the gap layer 16, and a third layer 17C disposed on a side of the second layer 17B opposite to the first layer 17A. The first layer 17A has an end face located in the medium facing surface 30 at a position forward of the end face of the pole layer 15 along the direction T of travel of the recording medium. The second layer 17B is directly connected to the first layer 17A and magnetically connected to the first layer 17A. The third layer 17C is directly connected to the second layer 17B and magnetically connected to the second layer 17B. Each of the second layer 17B and the third layer 17C has an end face closer to the medium facing surface 30. This end face of each of the second layer 17B and the third layer 17C is located at a distance from the medium facing surface 30. The first layer 17A, the second layer 17B and the third layer 17C can be made of any of CoFeN, CoNiFe, NiFe and CoFe, for example.

The magnetic head further includes: a yoke layer 18 disposed on a region of the pole layer 15 where the opening of the gap layer 16 is formed; a nonmagnetic layer 19 made of a nonmagnetic material and disposed around the first layer 17A and the yoke layer 18; and a coupling layer 24 disposed on the yoke layer 18. The yoke layer 18 and the coupling layer 24 are made of a magnetic material. The nonmagnetic layer 19 is made of, for example, an inorganic insulating material such as alumina or coating glass. The first layer 17A, the yoke layer 18 and the nonmagnetic layer 19 have flattened top surfaces.

The magnetic head further includes: an insulating layer 20 disposed on regions of the top surfaces of the yoke layer 18 and the nonmagnetic layer 19 where a coil 21 described later is to be disposed; the coil 21 disposed on the insulating layer 20; and a photoresist layer 25 disposed around the coil 21 and in the space between the respective adjacent turns of the coil 21. The insulating layer 20 is made of alumina, for example. The coil 21 includes a first layer 21A disposed on the insulating layer 20, and a second layer 21B disposed on the first layer 21A. The coil 21 is planar spiral-shaped. Part of the coil 21 passes between the second layer 17B and the coupling layer 24. The coil 21 is made of a conductive material such as copper. The photoresist layer 25 is made of photoresist. Part of the photoresist layer 25 covers the end face of the second layer 17B closer to the medium facing surface 30.

The magnetic head further includes a nonmagnetic layer 26 disposed between the photoresist layer 25 and the medium facing surface 30. The nonmagnetic layer 26 is made of an inorganic insulating material such as alumina. The second layer 17B, the coil 21, the coupling layer 24, the photoresist layer 25 and the nonmagnetic layer 26 have flattened top surfaces.

The magnetic head further includes an insulating layer 27 disposed on the coil 21, the photoresist layer 25 and the nonmagnetic layer 26. The insulating layer 27 has an opening for exposing the top surface of the second layer 17B, and an opening for exposing the top surface of the coupling layer 24. The insulating layer 27 is made of, for example, an inorganic insulating material such as alumina.

The third layer 17C of the shield 17 is disposed on the insulating layer 27 and touches the top surface of the second layer 17B and the top surface of the coupling layer 24 through the two openings formed in the insulating layer 27, thereby magnetically connecting the second layer 17B and the coupling layer 24 to each other.

The portion from the coil 11 to the third layer 17C of the shield 17 makes up a write head. The magnetic head further includes a protection layer 29 made of a nonmagnetic material and formed to cover the third layer 17C. The protection layer 29 is made of, for example, an inorganic insulating material such as alumina.

As described so far, the magnetic head of this embodiment includes the medium facing surface 30 that faces toward the recording medium, the read head, and the write head. The read head and the write head are stacked on the substrate 1. The read head is disposed backward along the direction T of travel of the recording medium (that is, disposed closer to the air inflow end of the slider), while the write head is disposed forward along the direction T of travel of the recording medium (that is, disposed closer to the air outflow end of the slider).

The read head includes: the MR element 5 as the read element; the bottom shield layer 3 and the top shield layer 7 for shielding the MR element 5, portions of the shield layers 3 and 7 located on a side of the medium facing surface 30 being opposed to each other with the MR element 5 located in between; the bottom shield gap film 4 disposed between the MR element 5 and the bottom shield layer 3; and the top shield gap film 6 disposed between the MR element 5 and the top shield layer 7.

The write head includes the coil 11, the pole layer 15, the gap layer 16, the shield 17, the yoke layer 18, the coil 21, the coupling layer 24, the photoresist layer 25, and the nonmagnetic layer 26. The coils 11 and 21 generate a magnetic field corresponding to data to be written on the recording medium. The coil 11 is not an essential component of the write head and may be dispensed with.

The pole layer 15 has an end face located in the medium facing surface 30, allows a magnetic flux corresponding to the magnetic field generated by the coil 21 to pass therethrough, and generates a write magnetic field for writing data on the recording medium by means of the perpendicular magnetic recording system. As illustrated in FIG. 2, the end face of the pole layer 15 located in the medium facing surface 30 has a width that decreases with decreasing distance from the substrate 1.

The shield 17 includes the first layer 17A, the second layer 17B and the third layer 17C. The first layer 17A has an end face located in the medium facing surface 30 at a position forward of the end face of the pole layer 15 along the direction T of travel of the recording medium. The second layer 17B is directly connected to the first layer 17A and magnetically connected to the first layer 17A. The second layer 17B is disposed between the medium facing surface 30 and at least part of the coil 21. The third layer 17C is directly connected to the second layer 17B and magnetically connected to the second layer 17B. Each of the second layer 17B and the third layer 17C has an end face closer to the medium facing surface 30. This end face of each of the second layer 17B and the third layer 17C is located at a distance from the medium facing surface 30. The shield 17 is coupled to a region of the pole layer 15 away from the medium facing surface 30 through the coupling layer 24 and the yoke layer 18.

In the medium facing surface 30, the gap layer 16 is located between the end face of the first layer 17A and the end face of the pole layer 15. The distance between the end face of the first layer 17A and the end face of the pole layer 15 in the medium facing surface 30 is within a range of 30 to 60 nm, for example. At least part of the coil 21 is located between the pole layer 15 and the shield 17 and insulated from the pole layer 15 and the shield 17.

In this embodiment, as illustrated in FIG. 1, the coil 21 and the second layer 17B are disposed forward of the first layer 17A along the direction T of travel of the recording medium. The second layer 17B is disposed between at least part of the coil 21 and the medium facing surface 30, and is directly connected to the first layer 17A. The second layer 17B has an end face closer to the medium facing surface 30, and this end face is located at a distance from the medium facing surface 30. The nonmagnetic layer 26 is disposed between the end face of the second layer 17B and the medium facing surface 30. The photoresist layer 25 is disposed between the end face of the second layer 17B and the nonmagnetic layer 26.

Furthermore, as illustrated in FIG. 1, the photoresist layer 25 has an end face 25a that touches the nonmagnetic layer 26. The distance from the medium facing surface 30 to any point on this end face 25a increases with increasing distance from the substrate 1 to the point.

FIG. 3 is a top view of the pole layer 15 and the shield 17. As illustrated in FIG. 3, the pole layer 15 includes: a track width defining portion 15A having an end face located in the medium facing surface 30; and a wide portion 15B that is located farther from the medium facing surface 30 than is the track width defining portion 15A and that has a greater width than the track width defining portion 15A. The track width defining portion 15A has a width that does not change in accordance with the distance from the medium facing surface 30. For example, the wide portion 15B is equal in width to the track width defining portion 15A at the boundary with the track width defining portion 15A, and gradually increases in width as the distance from the medium facing surface 30 increases and then maintains a specific width to the end of the wide portion 15B.

Reference is now made to FIG. 4A to FIG. 15A and FIG. 4B to FIG. 15B to describe a method of manufacturing the magnetic head of the embodiment. FIG. 4A to FIG. 15A each illustrate a cross section of a stack of layers formed in the course of manufacturing the magnetic head, the cross section being perpendicular to the medium facing surface and the top surface of the substrate. FIG. 4B to FIG. 15B each illustrate a cross section of a portion of the stack of layers near the medium facing surface, the cross section being parallel to the medium facing surface. The portions closer to the substrate 1 than the pole layer 15 are omitted in FIG. 4A to FIG. 15A and FIG. 4B to FIG. 15B.

In the method of manufacturing the magnetic head of the embodiment, first, as illustrated in FIG. 1, the insulating layer 2, the bottom shield layer 3 and the bottom shield gap film 4 are formed in this order on the substrate 1. Next, the MR element 5 and leads (not shown) connected to the MR element 5 are formed on the bottom shield gap film 4. Next, the MR element 5 and the leads are covered with the top shield gap film 6. Next, the top shield layer 7, the nonmagnetic layer 8, the second top shield layer 9 and the insulating layer 10 are formed in this order on the top shield gap film 6. Next, the coil 11 and the insulating layers 12 and 13 are formed on the insulating layer 10. Next, the top surfaces of the coil 11 and the insulating layers 12 and 13 are flattened by chemical mechanical polishing (hereinafter referred to as CMP), for example.

Next, the insulating layer 14 is formed on the flattened top surfaces of the coil 11 and the insulating layers 12 and 13. Next, the pole layer 15 is formed on the insulating layer 14 by frame plating, for example. Next, the gap layer 16 is formed over the entire top surface of the stack of layers by sputtering, for example. Next, the gap layer 16 is polished by CMP, for example, so that the portion of the gap layer 16 located on the pole layer 15 attains a predetermined thickness.

FIG. 4A and FIG. 4B illustrate the next step. In this step, first, in a region away from the medium facing surface 30, the portion of the gap layer 16 located on the pole layer 15 is selectively etched to form an opening in the gap layer 16. Next, the first layer 17A is formed on the gap layer 16 and the yoke layer 18 is formed in the region on top of the pole layer 15 where the opening of the gap layer 16 is located. The first layer 17A and the yoke layer 18 may be formed by frame plating, or may be formed by first forming a magnetic layer by sputtering and then selectively etching this magnetic layer.

Next, the nonmagnetic layer 19 is formed on the entire top surface of the stack of layers. Next, the nonmagnetic layer 19 is polished by CMP, for example, so that the first layer 17A and the yoke layer 18 are exposed, and the top surfaces of the first layer 17A, the yoke layer 18 and the nonmagnetic layer 19 are flattened. Next, the insulating layer 20 is formed on regions of the top surfaces of the yoke layer 18 and the nonmagnetic layer 19 where the coil 21 is to be disposed. Next, a seed layer 21AP, which is to become the first layer 21A of the coil 21 later, is formed on the entire top surface of the stack of layers. The seed layer 21AP is made of copper, for example.

FIG. 5A and FIG. 5B illustrate the next step. In this step, a frame 22 for forming the second layer 21B of the coil 21 is formed on the seed layer 21AP. The frame 22 is formed by patterning a photoresist layer by photolithography. The frame 22 has an opening at a position at which the second layer 21B is to be formed.

FIG. 6A and FIG. 6B illustrate the next step. In this step, the second layer 21B is formed in the opening of the frame 22. The second layer 21B is made of copper, for example.

FIG. 7A and FIG. 7B illustrate the next step. In this step, first, the frame 22 is removed. Next, the seed layer 21AP except a portion thereof located below the second layer 21B is removed. As a result, the remaining portion of the seed layer 21AP becomes the first layer 21A, whereby the coil 21 made up of the first layer 21A and the second layer 21B is completed.

FIG. 8A and FIG. 8B illustrate the next step. In this step, the second layer 17B and the coupling layer 24 are formed by frame plating. However, the formation of the second layer 17B and the coupling layer 24 may precede the formation of the coil 21.

FIG. 9A and FIG. 9B illustrate the next step. In this step, an initial layer 25P made of photoresist is formed around the coil 21 and the second layer 17B and in the space between the respective adjacent turns of the coil 21. The initial layer 25P becomes the photoresist layer 25 later by undergoing heat treatment.

FIG. 10A and FIG. 10B illustrate the next step. In this step, the initial layer 25P is heat-treated so that the initial layer 25P shrinks to thereby become the photoresist layer 25. The photoresist layer 25 formed by this heat treatment has, as shown in FIG. 10A, the end face 25a inclined with respect to the direction perpendicular to the top surface of the substrate 1. The distance from the medium facing surface 30 to any point on this end face 25a increases with increasing distance from the substrate 1 to the point.

FIG. 11A and FIG. 11B illustrate the next step. In this step, the nonmagnetic layer 26 is formed by sputtering, for example, on the entire top surface of the stack of layers. The nonmagnetic layer 26 is made of an inorganic insulating material such as alumina.

FIG. 12A and FIG. 12B illustrate the next step. In this step, the nonmagnetic layer 26 is polished by CMP, for example, so that the second layer 17B, the coupling layer 24 and the coil 21 are exposed and they attain desired thicknesses. As a result, the top surfaces of the second layer 17B, the coupling layer 24, the coil 21, the photoresist layer 25 and the nonmagnetic layer 26 are flattened.

FIG. 13A and FIG. 13B illustrate the next step. In this step, first, the insulating layer 27 is formed on the entire top surface of the stack of layers. Next, an etching mask 28 is formed on the insulating layer 27. The etching mask 28 is formed by patterning a photoresist layer by photolithography. The etching mask 28 has openings formed at positions above the second layer 17B and above the coupling layer 24, respectively.

FIG. 14A and FIG. 14B illustrate the next step. In this step, portions of the insulating layer 27 that are not covered with the etching mask 28 are selectively etched by ion beam etching, for example. As a result, there are formed in the insulating layer 27 the opening for exposing the top surface of the second layer 17B and the opening for exposing the top surface of the coupling layer 24.

FIG. 15A and FIG. 15B illustrate the next step. In this step, the third layer 17C is formed by frame plating, for example, whereby the shield 17 is completed.

Next, the protection layer 29 is formed to cover the entire top surface of the stack of layers. Next, wiring and terminals are formed on the protection layer 29, the substrate is cut into sliders, and the steps including polishing of the medium facing surface 30 and fabrication of flying rails are performed, whereby the magnetic head is completed.

The operation and effects of the magnetic head of the embodiment will now be described. In the magnetic head, the write head writes data on a recording medium while the read head reads data written on the recording medium. In the write head, the coil 21 generates a magnetic field corresponding to data to be written on the recording medium. The pole layer 15, the shield 17, the yoke layer 18 and the coupling layer 24 form a magnetic path that allows a magnetic flux corresponding to the magnetic field generated by the coil 21 to pass therethrough. The pole layer 15 allows the magnetic flux corresponding to the magnetic field generated by the coil 21 to pass and generates a write magnetic field used for writing the data on the recording medium by means of the perpendicular magnetic recording system.

The position of an end of the bit pattern to be written on the recording medium is determined by the position of one end of the end face of the pole layer 15 located in the medium facing surface 30, the one end being located forward along the direction T of travel of the recording medium (located closer to the air outflow end of the slider). In the embodiment, the width of the end face of the pole layer 15 located in the medium facing surface 30 decreases with decreasing distance from the substrate 1. As a result, according to the embodiment, it is possible to prevent the problems resulting from the skew.

The shield 17 takes in a disturbance magnetic field applied to the magnetic head from outside of the magnetic head. As a result, it is possible to prevent erroneous writing on the recording medium induced by the disturbance magnetic field intensively taken into the pole layer 15.

Furthermore, according to the embodiment, in the medium facing surface 30 the end face of the first layer 17A of the shield 17 is located forward of the end face of the pole layer 15 along the direction T of travel of the recording medium, with a predetermined small distance provided therebetween by the gap layer 16. The shield 17 takes in a magnetic flux that is generated from the end face of the pole layer 15 located in the medium facing surface 30 and that expands in directions except the direction perpendicular to the plane of the recording medium, and thereby prevents this magnetic flux from reaching the recording medium. It is thereby possible to prevent the direction of magnetization of the bit pattern already written on the recording medium from being changed due to the effect of the magnetic flux mentioned above. Consequently, according to the embodiment, it is possible to improve the linear recording density.

Figure 18:
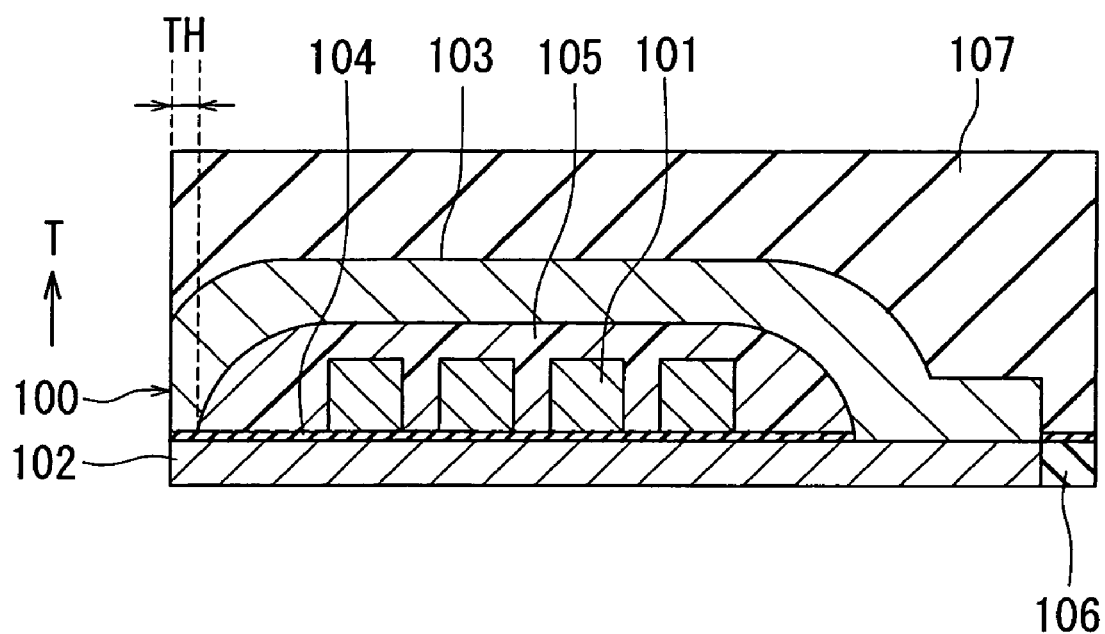
FIG. 18 is a cross-sectional view illustrating a main part of an example of shield-type heads.

In the embodiment, the nonmagnetic layer 19 is disposed around the first layer 17A of the shield 17. In addition, the end face of the second layer 17B of the shield 17 closer to the medium facing surface 30 is not exposed at the medium facing surface 30, and there exist the photoresist layer 25 and the nonmagnetic layer 26 between the end face of the second layer 17B and the medium facing surface 30. Consequently, according to the embodiment, the end face of the shield 17 exposed at the medium facing surface 30 can be smaller in area, compared with the magnetic head of FIG. 18. According to the embodiment, it is thus possible to suppress protrusion of the end portion of the shield 17 closer to the medium facing surface 30 occurring due to expansion of the insulating layer (photoresist layer 25) disposed around the coil 21. This effect is particularly noticeable when the nonmagnetic layers 19 and 26 are made of an inorganic insulating material harder than the photoresist layer 25, and/or when the nonmagnetic layer 19 and 26 are smaller in thermal expansion coefficient than the photoresist layer 25. To allow the above-mentioned effect to exert more noticeably, it is preferred that the coil 21 be disposed farther from the pole layer 15 than is a surface of the first layer 17A opposite to the pole layer 15.

In the magnetic head of the embodiment, the photoresist layer 25 is provided between the end face of the second layer 17B made of a magnetic material and the nonmagnetic layer 26 made of an inorganic insulating material. In the method of manufacturing the magnetic head of the embodiment, after the formation of the second layer 17B of the shield 17, the photoresist layer 25 is formed to touch the end face of the second layer 17B and then the nonmagnetic layer 26 is formed by sputtering to touch the end face 25a of the photoresist layer 25. Depositing the nonmagnetic layer 26 on the photoresist layer 25 as in this embodiment allows the nonmagnetic layer 26 to provide better coverage than in a case where the nonmagnetic layer 26 is deposited on the second layer 17B. Consequently, according to this embodiment, it is possible to prevent the occurrence of a crack in the nonmagnetic layer 26 resulting from poor coverage by the nonmagnetic layer 26.

Furthermore, in the embodiment, the photoresist layer 25 is formed to have the end face 25a that is inclined with respect the direction perpendicular to the top surface of the substrate 1, and the distance from the medium facing surface 30 to any point on this end face 25a increases with increasing distance from the substrate 1 to the point. The inclination of the end face 25a with respect to the direction perpendicular to the top surface of the substrate 1 allows even still better coverage by the nonmagnetic layer 26 as compared with a case where the end face 25a is perpendicular to the top surface of the substrate 1, thus making it possible to better prevent the occurrence of a crack in the nonmagnetic layer 26 resulting from poor coverage by the nonmagnetic layer 26.

Furthermore, in the embodiment, the photoresist layer 25 softer than the nonmagnetic layer 26 is disposed between the end face of the second layer 17B and the nonmagnetic layer 26. Consequently, according to the embodiment, even if the second layer 17B expands due to heat generated by the coil 21 and the end face of the second layer 17B is thereby displaced toward the medium facing surface 30, it is possible to prevent this displacement from being transferred to the nonmagnetic layer 26.

Second Embodiment

Figure 16:
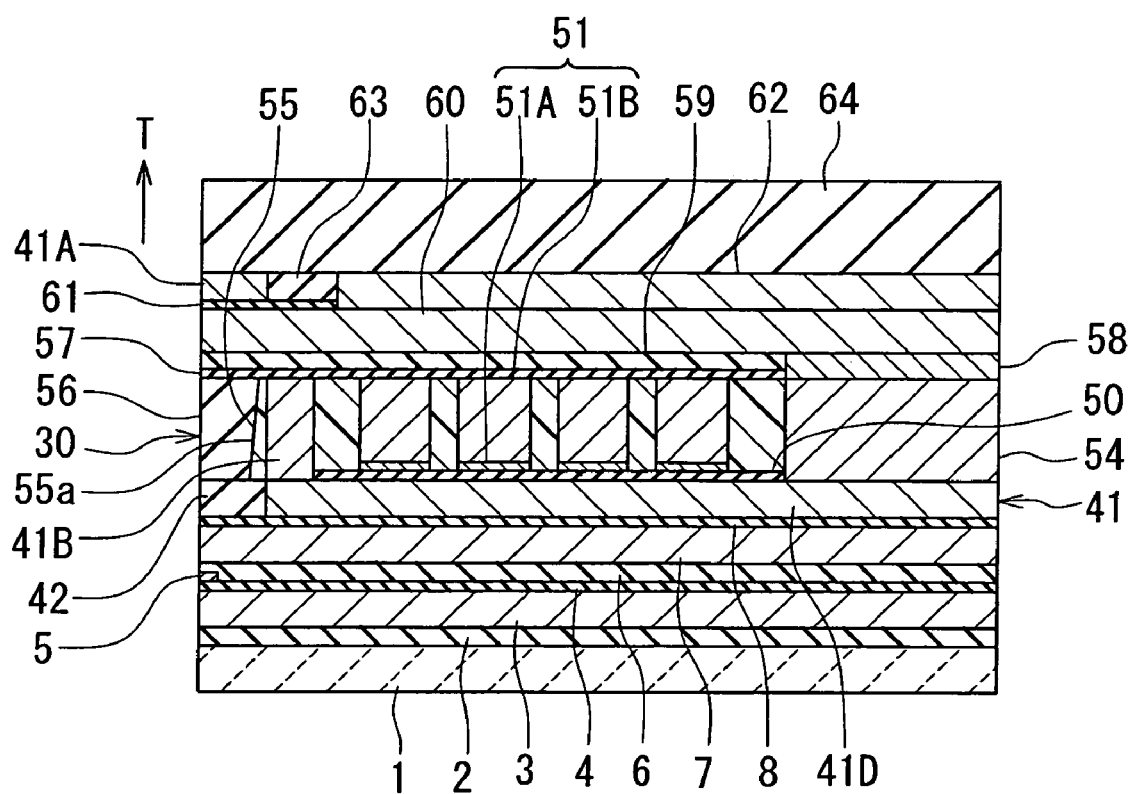
FIG. 16 is a cross-sectional view illustrating the configuration of a magnetic head of a second embodiment of the invention.
Figure 17:
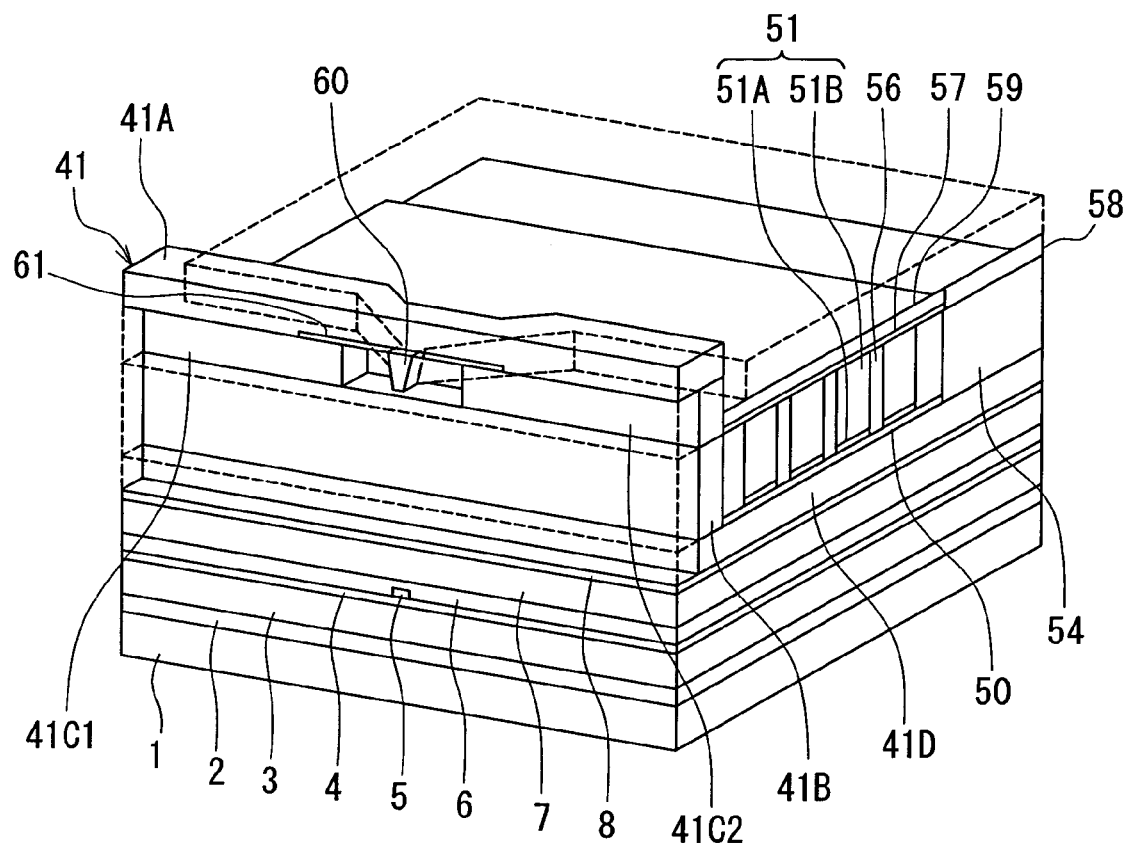
FIG. 17 is a perspective view illustrating a portion of the magnetic head of the second embodiment of the invention near the medium facing surface.

Reference is now made to FIG. 16 and FIG. 17 to describe a magnetic head and a method of manufacturing the same of a second embodiment of the invention. FIG. 16 is a cross-sectional view illustrating the configuration of the magnetic head of the second embodiment. FIG. 16 shows a cross section perpendicular to the medium facing surface and the top surface of the substrate. In FIG. 16 the arrow marked with T shows the direction of travel of the recording medium. FIG. 17 is a perspective view illustrating a portion of the magnetic head of the second embodiment near the medium facing surface.

The configuration of the read head of the magnetic head of the second embodiment is similar to that of the first embodiment. In the magnetic head of the second embodiment, as in the head of the first embodiment, the nonmagnetic layer 8 is disposed on the top shield layer 7 and the write head of the second embodiment is disposed on the nonmagnetic layer 8. The write head of the second embodiment includes a shield 41, a coil 51, coupling layers 54 and 58, a pole layer 60, a gap layer 61, and a yoke layer 62.

The coil 51 generates a magnetic field corresponding to data to be written on the recording medium. The pole layer 60 has an end face located in the medium facing surface 30, allows a magnetic flux corresponding to the magnetic field generated by the coil 51 to pass therethrough, and generates a write magnetic field for writing the data on the recording medium by means of the perpendicular magnetic recording system.

The shield 41 includes: a first layer 41A having an end face located in the medium facing surface 30 at a position forward of the end face of the pole layer 60 along the direction T of travel of the recording medium; a second layer 41B disposed such that the pole layer 60 is sandwiched between the second layer 41B and the first layer 41A; coupling portions 41C1 and 41C2 that couple the first layer 41A and the second layer 41B to each other without touching the pole layer 60; and a third layer 41D connected to the second layer 41B and disposed backward of the second layer 41B along the direction T of travel of the recording medium.

The coupling layer 54 is disposed on a region of the third layer 41D away from the medium facing surface 30. The coupling layer 58 is disposed on the coupling layer 54. The top surface of the coupling layer 58 touches the bottom surface of the pole layer 60.

The first layer 41A, the second layer 41B, the coupling portions 41C1 and 41C2, the third layer 41D and the coupling layers 54 and 58 are each made of a magnetic material. The material of these can be any of CoFeN, CoNiFe, NiFe, and CoFe.

The third layer 41D is disposed on the nonmagnetic layer 8. The third layer 41D has an end face closer to the medium facing surface 30, and this end face is located at a distance from the medium facing surface 30. The magnetic head further includes an insulating layer 42 made of an insulating material and disposed on the nonmagnetic layer 8 to surround the third layer 41D. The insulating layer 42 is made of alumina, for example.

The second layer 41B is disposed on a region of the third layer 41D near the medium facing surface 30. The second layer 41B has an end face closer to the medium facing surface 30, and this end face is located at a distance from the medium facing surface 30. The coupling layer 54 is disposed on a region of the third layer 41D farther from the medium facing surface 30 than is the second layer 41B.

As illustrated in FIG. 17, the coupling portions 41C1 and 41C2 are disposed on both sides of the pole layer 60 that are opposite to each other in the track width direction. The bottom surfaces of the coupling portions 41C1 and 41C2 touch the top surface of the second layer 41B, while the top surfaces of the coupling portions 41C1 and 41C2 touch the bottom surface of the first layer 41A.

The magnetic head further includes an insulating layer 50 made of an insulating material and disposed on the third layer 41D. The coil 51 includes a first layer 51A disposed on the insulating layer 50, and a second layer 51B disposed on the first layer 51A. The coil 51 is planar spiral-shaped, and is wound around the coupling layer 54. The magnetic head further includes a photoresist layer 55 disposed around the coil 51 and in the space between the respective adjacent turns of the coil 51. Part of the coil 51 passes between the second layer 41B and the coupling layer 54. The coil 51 is made of a conductive material such as copper. The photoresist layer 55 is made of photoresist. Part of the photoresist layer 55 covers the end face of the second layer 41B closer to the medium facing surface 30.

The magnetic head further includes a nonmagnetic layer 56 disposed between the photoresist layer 55 and the medium facing surface 30. The nonmagnetic layer 56 is made of an inorganic material such as alumina. The second layer 41B, the coil 51, the coupling layer 54, the photoresist layer 55 and the nonmagnetic layer 56 have flattened top surfaces.

The magnetic head further includes an insulating layer 57 disposed on the coil 51, the photoresist layer 55 and the nonmagnetic layer 56. The insulating layer 57 has an opening for exposing the top surface of the coupling layer 54. The insulating layer 57 is made of an inorganic insulating material such as alumina. The coupling layer 58 touches the top surface of the coupling layer 54 through the opening of the insulating layer 57.

The magnetic head further includes an insulating layer 59 disposed around the coupling layer 58. The insulating layer 59 is made of an inorganic insulating material such as alumina. The coupling layer 58 and the insulating layer 59 have flattened top surfaces.

The pole layer 60 is disposed on the coupling layer 58 and the insulating layer 59. An insulating layer not shown is provided around the pole layer 60. The pole layer 60 and the insulating layer around the pole layer 60 have flattened top surfaces.

The gap layer 61 is disposed on a region of the pole layer 60 near the medium facing surface 30. The gap layer 61 is made of a nonmagnetic material. The first layer 41A of the shield 41 is disposed on the gap layer 61.

The yoke layer 62 is disposed on a region of the pole layer 60 away from the medium facing surface 30. The magnetic head further includes a nonmagnetic layer 63 made of a nonmagnetic material and disposed around the first layer 41A and the yoke layer 62. The nonmagnetic layer 63 is made of alumina, for example. The first layer 41A, the yoke layer 62 and the nonmagnetic layer 63 have flattened top surfaces.

The magnetic head further includes a protection layer 64 made of a nonmagnetic material and disposed on the top surfaces of the first layer 41A, the yoke layer 62 and the nonmagnetic layer 63. The protection layer 64 is made of, for example, an inorganic insulating material such as alumina.

In the second embodiment, the first layer 41A of the shield 41 has an end face located in the medium facing surface 30 at a position forward of the end face of the pole layer 60 along the direction T of travel of the recording medium. The coil 51 and the second layer 41B of the shield 41 are disposed backward of the pole layer 60 along the direction T of travel of the recording medium. The second layer 41B is disposed between the medium facing surface 30 and at least part of the coil 51. The coupling portions 41C1 and 41C2 of the shield 41 couple the first layer 41A and the second layer 41B to each other without touching the pole layer 60. The second layer 41B is thereby magnetically connected to the first layer 41A. The pole layer 60, the shield 41, the coupling layers 54 and 58 and the yoke layer 62 form a magnetic path that allows a magnetic flux corresponding to the magnetic field generated by the coil 51 to pass therethrough.

The method of manufacturing the magnetic head of the second embodiment will now be described. The steps of the method of manufacturing the magnetic head of the second embodiment are the same as those of the first embodiment up to the step of forming the nonmagnetic layer 8. In the next step of the second embodiment, the third layer 41D of the shield 41 is formed. Next, the insulating layer 42 is formed on the entire top surface of the stack of layers. Next, the insulating layer 42 is polished by CMP, for example, so that the third layer 41D is exposed, and the top surfaces of the third layer 41D and the insulating layer 42 are flattened.

Next, the insulating layer 50 is formed on a region of the top surface of the third layer 41D where the coil 51 is to be disposed. Next, a seed layer to become the first layer 51A of the coil 51 later is formed on the entire top surface of the stack of layers. Next, a frame for forming the second layer 51B of the coil 51 is formed on the seed layer. Next, the second layer 51B of the coil 51 is formed on the seed layer by frame plating using the frame. Next, the frame is removed. Next, the seed layer except a portion thereof located below the second layer 51B is removed by ion beam etching, for example. As a result, the remaining portion of the seed layer becomes the first layer 51A, whereby the coil 51 made up of the first layer 51A and the second layer 51B is completed. Next, the second layer 41B and the coupling layer 54 are formed by frame plating, for example. However, the formation of the second layer 41B and the coupling layer 54 may precede the formation of the coil 51.

Next, an initial layer made of photoresist is selectively formed around the coil 51 and the second layer 41B and in the space between the respective adjacent turns of the coil 51. This initial layer becomes the photoresist layer 55 later by undergoing heat treatment. Next, the initial layer is heat-treated so that the initial layer shrinks to thereby become the photoresist layer 55. The photoresist layer 55 formed by this heat treatment has, as shown in FIG. 16, an end face 55a inclined with respect to the direction perpendicular to the top surface of the substrate 1. The distance from the medium facing surface 30 to any point on this end face 55a increases with increasing distance from the substrate 1 to the point.

Next, the nonmagnetic layer 56 is formed by sputtering, for example, on the entire top surface of the stack of layers. Next, the nonmagnetic layer 56 is polished by CMP, for example, so that the second layer 41B, the coupling layer 54 and the coil 51 are exposed and they attain desired thicknesses. As a result, the top surfaces of the second layer 41B, the coupling layer 54, the coil 51, the photoresist layer 55 and the nonmagnetic layer 56 are flattened.

Next, the insulating layer 57 is formed on the entire top surface of the stack of layers. Next, the insulating layer 57 is selectively etched to form the opening for exposing the top surface of the coupling layer 54 in the insulating layer 57. Next, the coupling layer 58 is formed on the coupling layer 54 by frame plating, for example. Next, the insulating layer 59 is formed on the entire top surface of the stack of layers. Next, the insulating layer 59 is polished by CMP, for example, so that the coupling layer 58 is exposed, and the top surfaces of the coupling layer 58 and the insulating layer 59 are flattened.

Next, the insulating layers 57 and 59 are selectively etched to form two openings for exposing the top surface of the second layer 41B in the insulating layers 57 and 58 at positions where the coupling portions 41C1 and 41C2 are to be disposed. Next, the coupling portions 41C1 and 41C2 are formed by frame plating, for example, at the positions where the two openings of the insulating layers 57 and 59 are located. The coupling portions 41C1 and 41C2 touch the top surface of the second layer 41B through the openings of the insulating layers 57 and 59.

Next, the pole layer 60 is formed on the insulating layer 59 by frame plating, for example. Next, an insulating layer not shown is formed by sputtering, for example, on the entire top surface of the stack of layers. Next, the insulating layer is polished by CMP, for example, so that the pole layer 60 and the coupling portions 41C1 and 41C2 are exposed and they attain desired thicknesses. The top surfaces of the pole layer 60, the coupling portions 41C1 and 41C2 and the insulating layer are thereby flattened.

Next, the gap layer 61 is formed by sputtering, for example, on the entire top surface of the stack of layers. Next, the gap layer 61 is selectively etched to form in the gap layer 61 two openings for exposing the top surfaces of the coupling portions 41C1 and 41C2 and an opening for exposing a region of the top surface of the pole layer 60 away from the medium facing surface 30.

Next, the first layer 41A and the yoke layer 62 are formed by frame plating, for example. The first layer 41A is formed on the gap layer 61 and connected to the coupling portions 41C1 and 41C2 through the two openings of the gap layer 61. The yoke layer 62 is connected to the pole layer 60 through the opening formed in a region of the gap layer 61 away from the medium facing surface 30.

Next, the nonmagnetic layer 63 is formed on the entire top surface of the stack of layers. Next, the nonmagnetic layer 63 is polished by CMP, for example, so that the first layer 41A and the yoke layer 62 are exposed, and the top surfaces of the first layer 41A, the yoke layer 62 and the nonmagnetic layer 63 are flattened. Next, the protection layer 64 is formed to cover the entire top surface of the stack of layers. Next, wiring and terminals are formed on the protection layer 64, the substrate is cut into sliders, and the steps including polishing of the medium facing surface 30 and fabrication of flying rails are performed, whereby the magnetic head is completed.

The magnetic head of the second embodiment is provided with the photoresist layer 55 between the end face of the second layer 41B of the shield 41 and the nonmagnetic layer 56 made of an inorganic insulating material. In the method of manufacturing the magnetic head of the second embodiment, after the formation of the second layer 41B, the photoresist layer 55 is formed to touch the end face of the second layer 41B and then the nonmagnetic layer 56 is formed by sputtering to touch the end face 55a of the photoresist layer 55. Depositing the nonmagnetic layer 56 on the photoresist layer 55 as in this embodiment allows the nonmagnetic layer 56 to provide better coverage than in a case where the nonmagnetic layer 56 is deposited on the second layer 41B. Consequently, according to the embodiment, it is possible to prevent the occurrence of a crack in the nonmagnetic layer 56 resulting from poor coverage by the nonmagnetic layer 56.

Furthermore, in the second embodiment, the photoresist layer 55 is formed to have the end face 55a that is inclined with respect the direction perpendicular to the top surface of the substrate 1, and the distance from the medium facing surface 30 to any point on this end face 55a increases with increasing distance from the substrate 1 to the point. The inclination of the end face 55a with respect to the direction perpendicular to the top surface of the substrate 1 allows still better coverage by the nonmagnetic layer 56 as compared with a case where the end face 55a is perpendicular to the top surface of the substrate 1, thus making it possible to better prevent the occurrence of a crack in the nonmagnetic layer 56 resulting from poor coverage by the nonmagnetic layer 56.

Furthermore, in the second embodiment, the photoresist layer 55 softer than the nonmagnetic layer 56 is disposed between the end face of the second layer 41B and the nonmagnetic layer 56. Consequently, according to the embodiment, even if the second layer 41B expands due to heat generated by the coil 51 and the end face of the second layer 41B is thereby displaced toward the medium facing surface 30, it is possible to prevent this displacement from being transferred to the nonmagnetic layer 56.

The remainder of configuration, function and effects of the second embodiment are similar to those of the first embodiment.

The present invention is not limited to the foregoing embodiments but can be carried out in various modifications. For example, in each of the foregoing embodiments, a coil helically wound around the pole layer 15 or 60 may be provided in place of the planar spiral-shaped coil.

While the foregoing embodiments have been described with reference to a magnetic head having a structure in which the read head is formed on the base body and the write head is stacked on the read head, the read head and the write head may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording comprising:
   a medium facing surface that faces toward a recording medium;
   a coil for generating a magnetic field corresponding to data to be written on the recording medium;
   a pole layer having an end face located in the medium facing surface, the pole layer allowing a magnetic flux corresponding to the magnetic field generated by the coil to pass therethrough and generating a write magnetic field for writing the data on the recording medium by means of a perpendicular magnetic recording system;
   a shield made of a magnetic material; and
   a gap layer made of a nonmagnetic material, wherein:
      the shield includes: a first layer having an end face located in the medium facing surface at a position forward of the end face of the pole layer along a direction of travel of the recording medium; and a second layer disposed between at least part of the coil and the medium facing surface and magnetically connected to the first layer;
      the second layer has an end face that faces toward to the medium facing surface, the end face being located at a distance from the medium facing surface; and
      the gap layer is disposed between the pole layer and the first layer, the magnetic head further comprising: a nonmagnetic layer made of an inorganic insulating material and disposed between the end face of the second layer and the medium facing surface; and a photoresist layer disposed between the end face of the second layer and the nonmagnetic layer.

2. The magnetic head for perpendicular magnetic recording according to claim 1, wherein the second layer and the at least part of the coil are disposed forward of the first layer along the direction of travel of the recording medium, and the second layer is directly connected to the first layer.

3. The magnetic head for perpendicular magnetic recording according to claim 1, wherein:
   the second layer and the at least part of the coil are disposed backward of the pole layer along the direction of travel of the recording medium; and
   the shield further includes a coupling portion that couples the first layer and the second layer to each other without touching the pole layer.

4. The magnetic head for perpendicular magnetic recording according to claim 1, further comprising a substrate on which the coil, the pole layer, the shield, the gap layer, the nonmagnetic layer and the photoresist layer are stacked,
   wherein the photoresist layer has an end face that touches the nonmagnetic layer, and a distance from the medium facing surface to any point on this end face increases with increasing distance from the substrate to the point.

5. A method of manufacturing a magnetic head for perpendicular magnetic recording, the magnetic head comprising:
   a medium facing surface that faces toward a recording medium;
   a coil for generating a magnetic field corresponding to data to be written on the recording medium;

a pole layer having an end face located in the medium facing surface, the pole layer allowing a magnetic flux corresponding to the magnetic field generated by the coil to pass therethrough and generating a write magnetic field for writing the data on the recording medium by means of a perpendicular magnetic recording system;

a shield made of a magnetic material; and a gap layer made of a nonmagnetic material, wherein:

the shield includes: a first layer having an end face located in the medium facing surface at a position forward of the end face of the pole layer along a direction of travel of the recording medium; and a second layer disposed between at least part of the coil and the medium facing surface and magnetically connected to the first layer;

the second layer has an end face that faces toward to the medium facing surface, the end face being located at a distance from the medium facing surface; and the gap layer is disposed between the pole layer and the first layer, the magnetic head further comprising: a nonmagnetic layer made of an inorganic insulating material and disposed between the end face of the second layer and the medium facing surface; and a photoresist layer disposed between the end face of the second layer and the nonmagnetic layer, the method comprising the steps of:

forming the pole layer;

forming the gap layer on the pole layer;

forming the first layer on the gap layer;

forming the coil;

forming the second layer;

forming the photoresist layer after the second layer is formed; and forming the nonmagnetic layer after the photoresist layer is formed.

6. The method of manufacturing the magnetic head for perpendicular magnetic recording according to claim 5, wherein the second layer and the at least part of the coil are disposed forward of the first layer along the direction of travel of the recording medium, the second layer is directly connected to the first layer, and the second layer is formed after the first layer is formed.

7. The method of manufacturing the magnetic head for perpendicular magnetic recording according to claim 5, wherein:

the second layer and the at least part of the coil are disposed backward of the pole layer along the direction of travel of the recording medium, and the shield further includes a coupling portion that couples the first layer and the second layer to each other without touching the pole layer, the method further comprising the step of forming the coupling portion, wherein the coupling portion is formed after the second layer is formed, and the first layer is formed after the coupling portion is formed.

8. The method of manufacturing the magnetic head for perpendicular magnetic recording according to claim 5, the magnetic head further comprising a substrate on which the coil, the pole layer, the shield, the gap layer, the nonmagnetic layer and the photoresist layer are stacked, wherein:

the photoresist layer has an end face that touches the nonmagnetic layer, and a distance from the medium facing surface to any point on this end face increases with increasing distance from the substrate to the point; and the step of forming the photoresist layer includes the steps of: forming an initial layer that is to become the photoresist layer later by undergoing heat treatment; and heat-treating the initial layer so that the initial layer shrinks to thereby become the photoresist layer.

9. The method of manufacturing the magnetic head for perpendicular magnetic recording according to claim 5, wherein the nonmagnetic layer is formed by sputtering.

* * * * *